(12) United States Patent  
Shen et al.

(10) Patent No.: US 9,188,844 B2
(45) Date of Patent: Nov. 17, 2015

(54) PROJECTION DEVICE AND LENS MODULE HAVING RIVETING PORTION EXTENDING ONTO LIGHT EMITTING SURFACE OF LENS

(71) Applicants: Jui-Chang Shen, Hsinchu (TW); Shih-Hsiung Kao, Hsinchu (TW); Ping-Hsun Huang, Hsinchu (TW); Mu-Hsi Huang, Hsinchu (TW)

(72) Inventors: Jui-Chang Shen, Hsinchu (TW); Shih-Hsiung Kao, Hsinchu (TW); Ping-Hsun Huang, Hsinchu (TW); Mu-Hsi Huang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 319 days.

(21) Appl. No.: 13/737,961

(22) Filed: Jan. 10, 2013

(65) Prior Publication Data

US 2013/0342818 A1 Dec. 26, 2013

(30) Foreign Application Priority Data

Jun. 20, 2012 (TW) .............................. 101122044 A

(51) Int. Cl.
*G03B 21/14* (2006.01)
*G02B 7/02* (2006.01)
*G03B 21/00* (2006.01)

(52) U.S. Cl.
CPC .............. *G03B 21/145* (2013.01); *G02B 7/021* (2013.01); *G02B 7/026* (2013.01); *G03B 21/142* (2013.01); *G03B 21/005* (2013.01)

(58) Field of Classification Search
CPC .... G03B 21/14; G03B 21/142; G03B 21/145; G02B 7/02; G02B 7/021; G02B 7/026; G02B 7/04

USPC .................. 353/100–101, 119; 359/601, 611, 359/649–651, 676, 738, 811, 819, 830
See application file for complete search history.

(56) References Cited

U.S. PATENT DOCUMENTS

| 4,199,227 | A  | * | 4/1980  | Uesugi et al. ................. 359/701 |
| 5,798,876 | A  | * | 8/1998  | Nagano .......................... 359/819 |
| 5,969,887 | A  | * | 10/1999 | Hagimori et al. ............. 359/819 |
| 6,310,735 | B1 | * | 10/2001 | Best et al. ..................... 359/819 |
| 6,590,721 | B2 | * | 7/2003  | Onda ............................. 359/819 |
| 6,771,438 | B2 | * | 8/2004  | Nishimura et al. ........... 359/819 |
| 7,021,772 | B2 | * | 4/2006  | Abe et al. ........................ 353/97 |
| 7,652,831 | B2 | * | 1/2010  | Watanabe ...................... 359/811 |
| 2005/0259228 | A1 | * | 11/2005 | Inadachi et al. ................ 353/74 |
| 2009/0122291 | A1 | * | 5/2009  | Moriyoshi ...................... 355/71 |

FOREIGN PATENT DOCUMENTS

TW                582561            4/2004

* cited by examiner

Primary Examiner — Jori S Reilly-Diakun
(74) Attorney, Agent, or Firm — Jianq Chyun IP Office

(57) ABSTRACT

A projection device includes a main body, a light source, a light valve, and a lens module. The light source produces an illumination beam. The light valve converts the illumination beam into an image beam. The lens module disposed at the main body includes a lens barrel and a lens. The lens barrel has an inner wall, a containing space and a riveting portion. The inner wall surrounds the containing space. The riveting portion is located in the containing space. There is a gap between the riveting portion and the inner wall. The lens disposed in the containing space has a light emitting surface and a side surface. The side surface leans against the riveting portion. An end of the riveting portion extends to the light emitting surface to limit the lens in the containing space The image beam passes through the lens to form a projection beam.

20 Claims, 8 Drawing Sheets

2

PROJECTION DEVICE AND LENS MODULE HAVING RIVETING PORTION EXTENDING ONTO LIGHT EMITTING SURFACE OF LENS

CROSS-REFERENCE TO RELATED APPLICATION

This application claims the priority benefit of Taiwan application serial no. 101122044, filed on Jun. 20, 2012. The entirety of the above-mentioned patent application is hereby incorporated by reference herein and made a part of this specification.

BACKGROUND OF THE INVENTION

1. Field of the Invention

The invention generally relates to an optoelectronic device and an optical module, and more particularly, to a projection device and a lens module.

2. Description of Related Art

The projection device is a display device for producing a large-size screen frame. The imaging principle of the projection device is to convert an illumination beam produced by a light source into an image beam through a light valve, followed by projecting the image beam through a lens onto a screen or a wall surface to form images. Along with the progress of the projection technology and the decrease in manufacturing cost, the application of the projection device has been gradually expanded to the domestic use from the commercial use.

In general, the projection device includes a projection lens module, and the projection lens module includes a lens barrel and at least one lens disposed in the lens barrel. In the prior art, the lens is fixed at the lens barrel mostly by using a pressured ring, glue or a wire spring. However, these ways of fixing the lens have shortages of high manufacturing cost, poor assembling accuracy or low reliability, so that some projection lens modules fix the lens by a riveting process. Nevertheless, many projection lens modules have implementation limit on the above-mentioned riveting process due to the original design.

Taiwan Patent No. 582561 discloses a method of fixing the lens. Herein, a riveting knife is used to form folded pieces at the lens barrel in a destructive way. However, the proposed scheme still fails to reduce the traditional shortage of high manufacturing cost, poor assembling accuracy or low reliability.

SUMMARY OF THE INVENTION

Accordingly, the invention is directed to a projection device with a lens in a lens barrel of a lens module being fixed by riveting.

The invention is also directed to a lens module with a lens in a lens barrel being fixed by riveting.

Other objectives and advantages of the invention should be further indicated by the disclosures of the invention, and omitted herein for simplicity.

To achieve one of, a part of or all of the above-mentioned objectives, or to achieve other objectives, an embodiment of the invention provides a projection device which includes a main body, a light source, a light valve, and a lens module. The light source is disposed in the main body and adapted to produce an illumination beam. The light valve is disposed in the main body and converts the illumination beam into an image beam. The lens module is disposed in the main body and includes at least one lens. The lens barrel has an inner wall, a containing space, and at least one riveting portion. The inner wall surrounds the containing space, the riveting portion is located in the containing space and there is a gap between the riveting portion and the inner wall. The lens is disposed in the containing space and has a light emitting surface and a side surface that leans against the riveting portion. An end of the riveting portion extends to the light emitting surface so as to limit the lens in the containing space, and the image beam passes through the lens to form a projection beam.

To achieve one of, a part of or all of the above-mentioned objectives, or to achieve other objectives, an embodiment of the invention provides a lens module which includes a lens barrel and at least one lens. The lens barrel has an inner wall, a containing space, and at least one riveting portion. The inner wall surrounds the containing space, the riveting portion is located in the containing space and there is a gap between the riveting portion and the inner wall. The lens is disposed in the containing space and has a light emitting surface and a side surface that leans against the riveting portion. An end of the riveting portion extends to the light emitting surface so as to limit the lens in the containing space.

Based on the description above, in the above-mentioned embodiment of the invention, the riveting portion leaning against the side surface of lens and the inner wall of the lens barrel have a gap therebetween, so that a riveting equipment could easily extend into the gap to press and overlay the end of the riveting portion onto the light emitting surface of the lens and thereby to fix the lens. In this way, even the lens is located inside the lens barrel, it is easier to fix the lens at the lens barrel through a riveting process by using an appropriate riveting equipment, which could save the manufacturing cost and advance the assembling accuracy and the reliability of the lens module.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
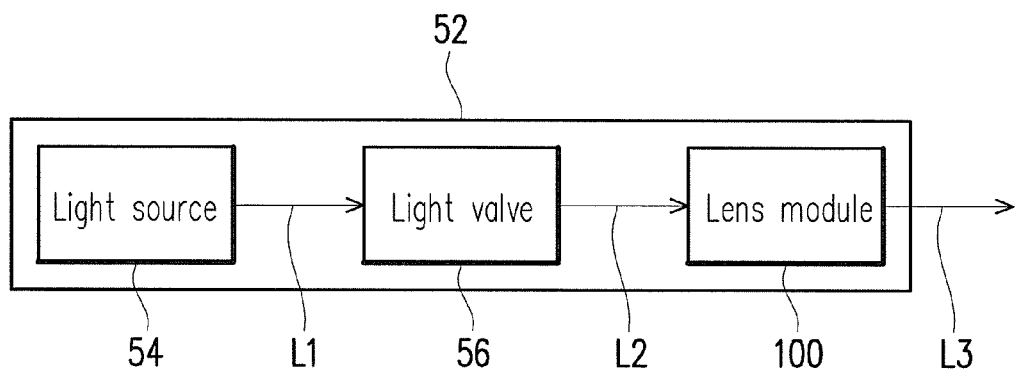
FIG. 1 is a schematic diagram of a projection device according to an embodiment of the invention.

FIG. 1 is a schematic diagram of a projection device according to an embodiment of the invention. Referring to FIG. 1, a projection device 50 includes a main body 52, a light source 54, a light valve 56, and a lens module 100. The light source 54 is disposed in the main body 52 and produces an illumination beam L1. The light valve 56 is disposed in the main body 52 and converts the illumination beam L1 into an image beam L2. The lens module 100 is disposed in the main body 52 and converts the image beam L2 into a projection beam L3.

Figure 2:
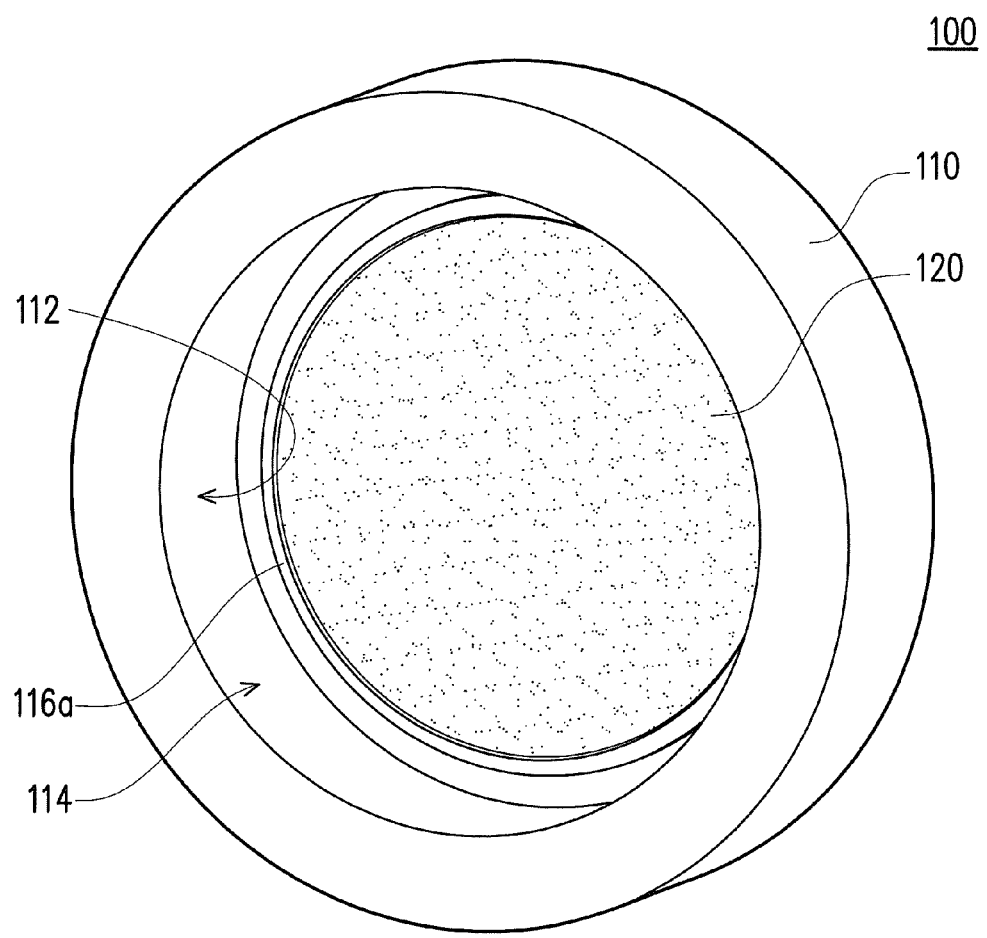
FIG. 2 is a three-dimensional diagram of the lens module in FIG. 1.
Figure 3:
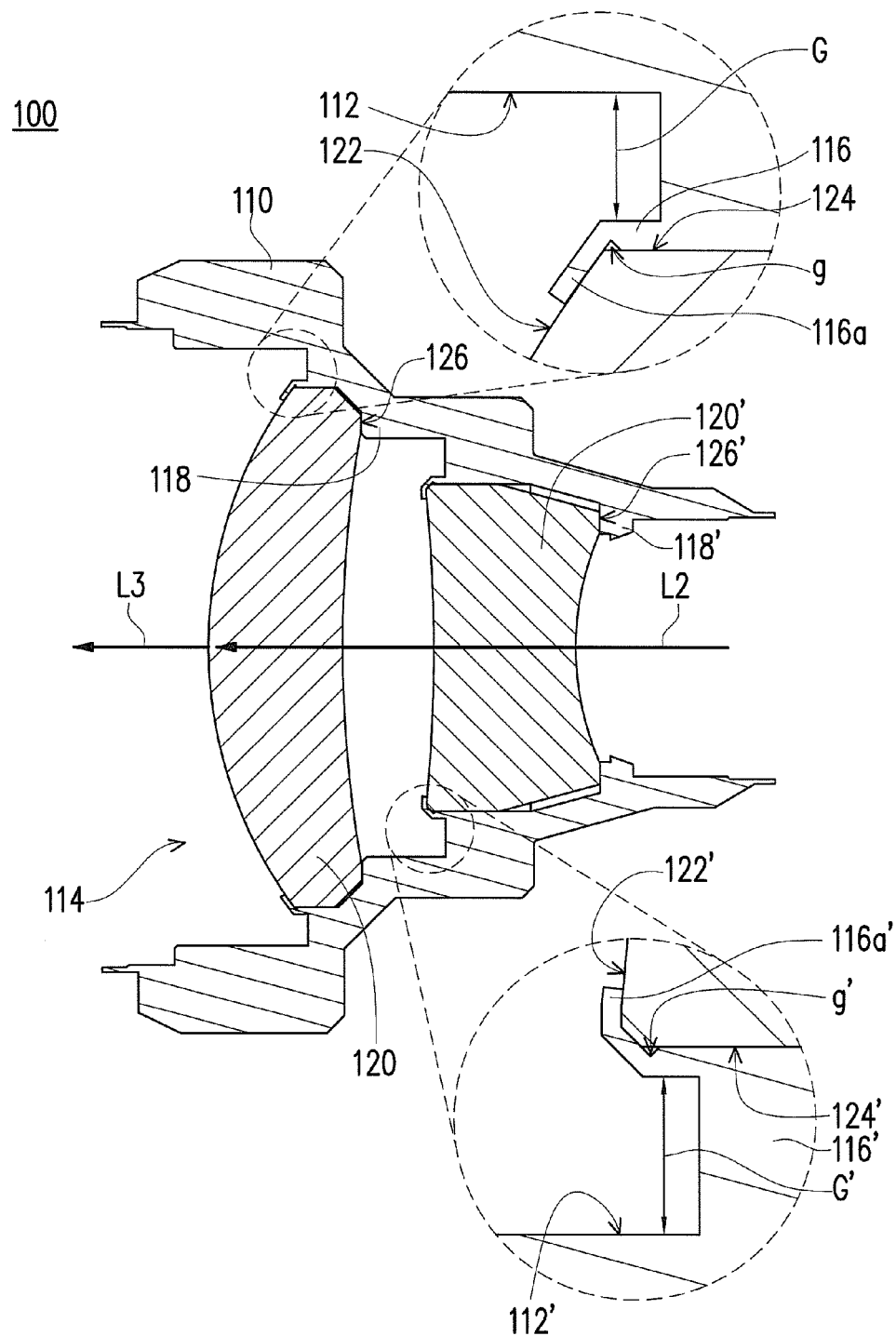
FIG. 3 is a cross-sectional diagram of the lens module in FIG. 2.

FIG. 2 is a three-dimensional diagram of the lens module of FIG. 1 and FIG. 3 is a cross-sectional diagram of the lens module of FIG. 2. Referring to FIGS. 2 and 3, the lens module 100 of the embodiment includes a lens barrel 110 and at least one lens 120. The lens barrel 110 has an inner wall 112, a containing space 114, and at least one riveting portion 116. The inner wall 112 surrounds the containing space 114, the riveting portion 116 is located in the containing space 114, and the riveting portion 116 and the inner wall 112 have a gap G therebetween. The lens 120 is disposed in the containing space 114 and has a light emitting surface 122 and a side surface 124. The side surface 124 leans against the riveting portion 116. For example, the side surface 124 in the embodiment is parallel to the inner wall 112 and is not parallel to the light emitting surface 122. An end 116a of the riveting portion 116 extends to the light emitting surface 122 so as to limit the position of the lens 120 in the containing space 114. The image beam L2 passes through the lens 120 to form the projection beam L3.

Under the above-mentioned layout, since the riveting portion 116 leaning against the side surface 124 of the lens 120 and the inner wall 112 of the lens barrel 110 have a gap G therebetween, a riveting equipment could easily extend into the gap G to press and overlay the end 116a of the riveting portion 116 onto the light emitting surface 122 of the lens 120 to fix the lens 120. In this way, even the lens 120 is located in the lens barrel 110, the lens 120 still could be riveted and fixed at the lens barrel 110 by an appropriate riveting equipment, which could save the manufacturing cost and advance the assembling accuracy.

Figure 4A:
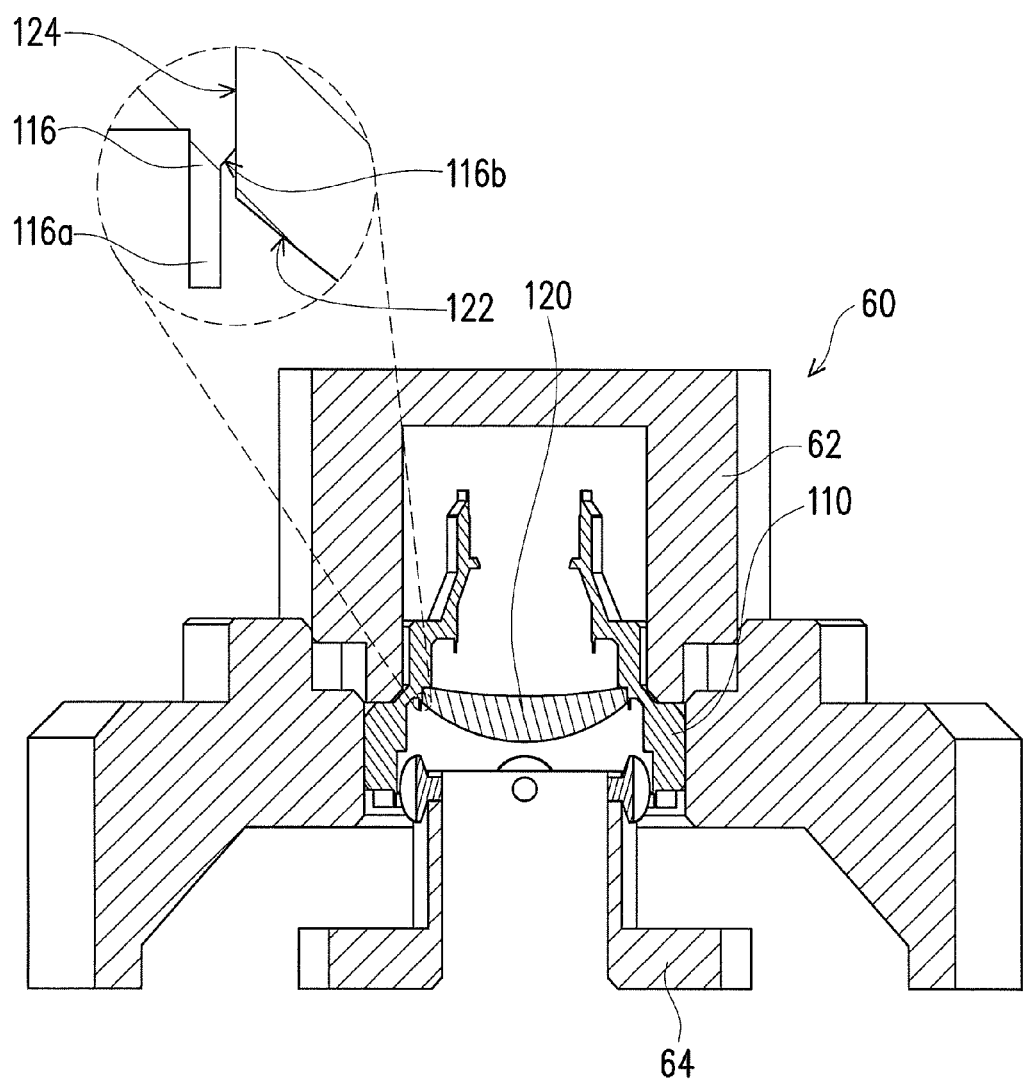
FIGS. 4A and 4B are diagrams shown the riveting process of the lens module in FIG. 3.
Figure 4B:
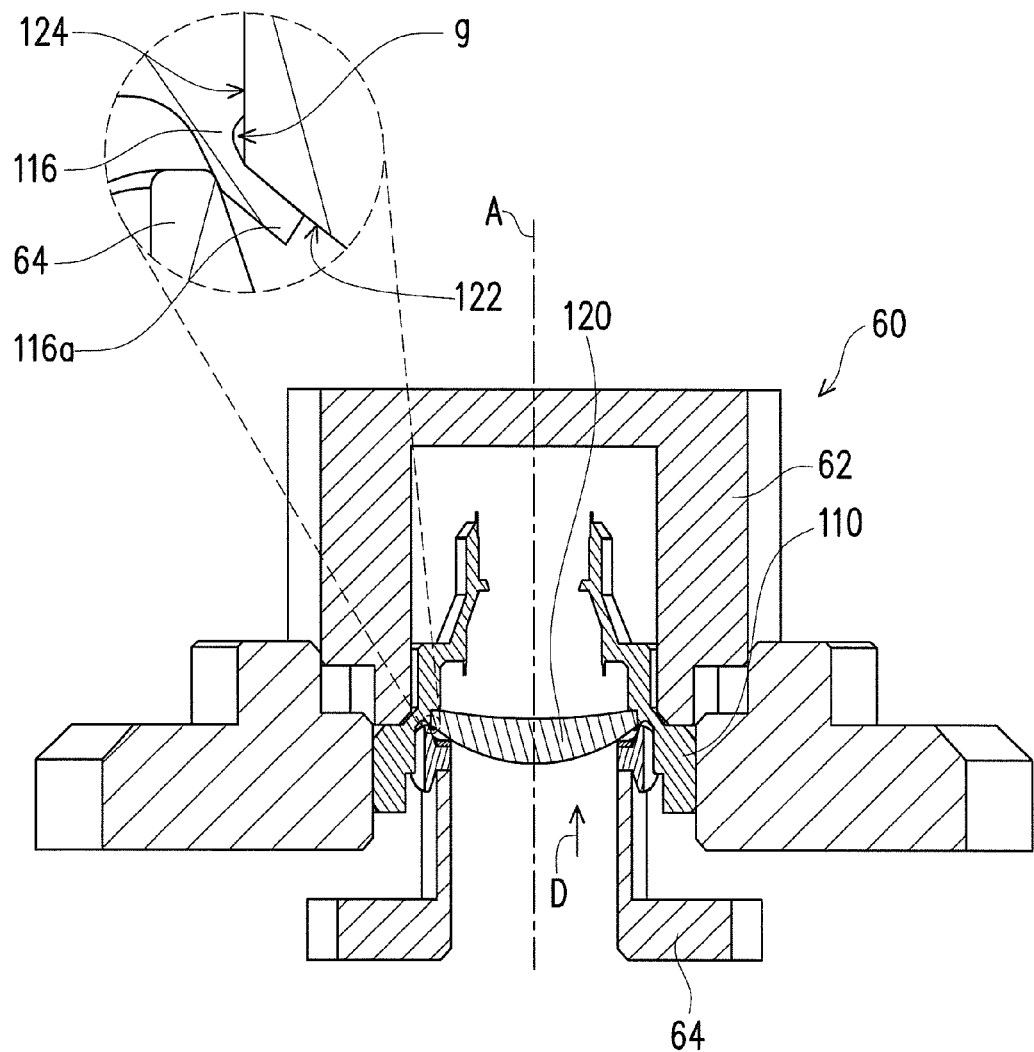

FIGS. 4A and 4B are riveting are diagrams shown the riveting process of the lens module in FIG. 3. Referring to FIGS. 4A and 4B, specifically, as shown by FIG. 4A, a lens barrel fixture 62 of a riveting equipment 60 is used to fix the lens barrel 110 and the lens 120 therein. At the time, a riveting fixture 64 of the riveting equipment 60 is aligned with the lens 120. Then, as shown by FIG. 4B, the riveting fixture 64 bends the end 116a of the riveting portion 116 of the lens barrel 110 so that the end 116a is pressed to the light emitting surface 122 of the lens 120, which makes the riveting fixture 64 rotate along an axis A relatively to the lens barrel 110 and the lens 120, and the end 116a of the riveting portion 116 is firmly riveted at the light emitting surface 122 of the lens 120 by compression and rotation of the riveting fixture 64. Using the above-mentioned way of relative rotation between the riveting fixture 64 and the lens barrel fixture 62, the riveting fixture 64 requires a smaller applying force along the direction D to smoothly rivet the lens 120 so as to avoid a too large riveting force damaging the lens 120 or producing an unpredicted inner stress inside the lens 120.

As shown by FIG. 4A, the riveting portion 116 of the lens barrel 110 has a chamfer 116b adjacent to the side surface 124 of the lens 120. After the end 116a of the riveting portion 116 is riveted at the light emitting surface 122 of the lens 120 as shown by FIG. 4B, at least a portion of the side surface 124 of the lens 120 (the portion is adjacent to the light emitting surface 122 in figures) and the riveting portion 116 have an interval g therebetween. The above-mentioned interval g could avoid the riveting portion 116 from pressing the lens 120 to damage the lens 120 during the riveting process.

The invention does not limit the quantities of the riveting portion and the lens. In fact both the quantities of the riveting portion and the lens could be multiple referring to the following description with accompanying figures. Referring to FIG. 3 again, in addition to the lens 120, the lens module 100 in the embodiment further has another lens 120', and in addition to the riveting portion 116, the lens barrel 110 further has another riveting portion 116'. The riveting portions 116 and 116' are respectively corresponding to the lenses 120 and 120'. The image beam L2 after passing through the lenses 120 and 120' is converted into the projection beam L3.

In the embodiment, the design of the riveting portion 116' is similar to the riveting portion 116. Since the riveting portion 116' leaning against the side surface 124' of the lens 120' and the inner wall 112' of the riveting portion 116 have a gap G', the riveting equipment could easily extend into the gap G' to press and overlay the end 116a' of the riveting portion 116' onto the light emitting surface 122' of the lens 120' to fix the lens 120'. In addition, by using the interval g' between the riveting portion 116' and the side surface 124' of the lens 120', it could avoid the riveting portion 116' from pressing the lens 120' to damage the lens 120' during the riveting process. The details of the riveting process for the lens 120' is similar to the riveting process as shown by FIGS. 4A and 4B, which is omitted to describe.

Figure 5:
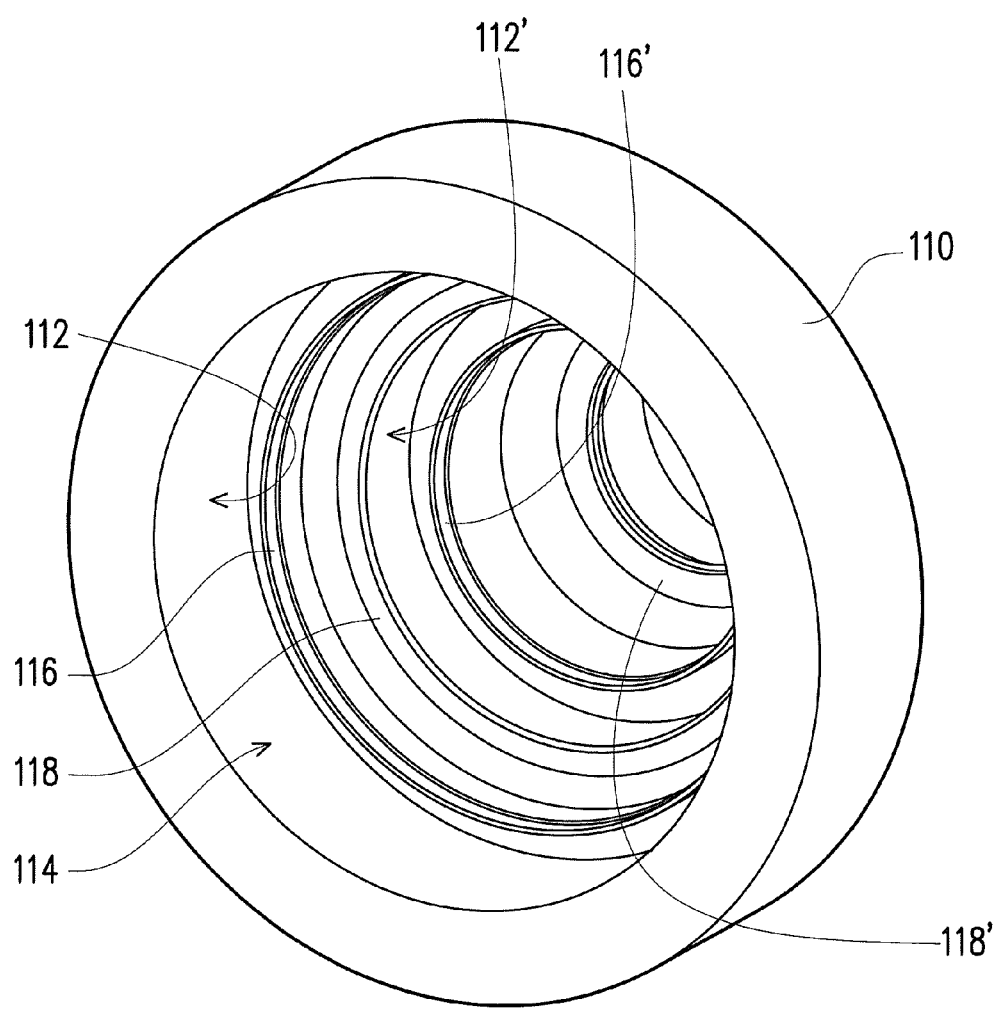
FIG. 5 is a three-dimensional diagram of the lens barrel in FIG. 2.

In the embodiment, the material of the lens barrel 110 is, for example, metal, and the riveting portions 116 and 116' and the inner wall 112 are integrally formed. FIG. 5 is a three-dimensional diagram of the lens barrel in FIG. 2. In FIG. 5, the lens 120 of FIG. 3 and the lens 120' are not disposed at the riveting portion 116, the riveting portions 116 and 116' herein are not bended. Referring to FIGS. 2, 3, and 5, the riveting portion 116 in the embodiment is ringed and surrounds the lens 120 and the riveting portion 116' is ringed and surrounds the lens 120' as well, which are helpful to firmly fix the lenses 120 and 120' inside the lens barrel 110.

As shown by FIGS. 3 and 5, in the embodiment, the lens barrel 110 has two retaining portions 118 and 118', the lens 120 has a relying surface 126, and the lens 120' has a relying surface 126'. The relying surface 126 is opposite to the light emitting surface 122 and leans against the retaining portion 118 to firmly fix the lens 120 between the retaining portion 118 and the riveting portion 116. Similarly, the relying surface 126' is opposite to the light emitting surface 122' and leans against the retaining portion 118' to firmly fix the lens 120' between the retaining portion 118' and the riveting portion 116'.

Figure 6:
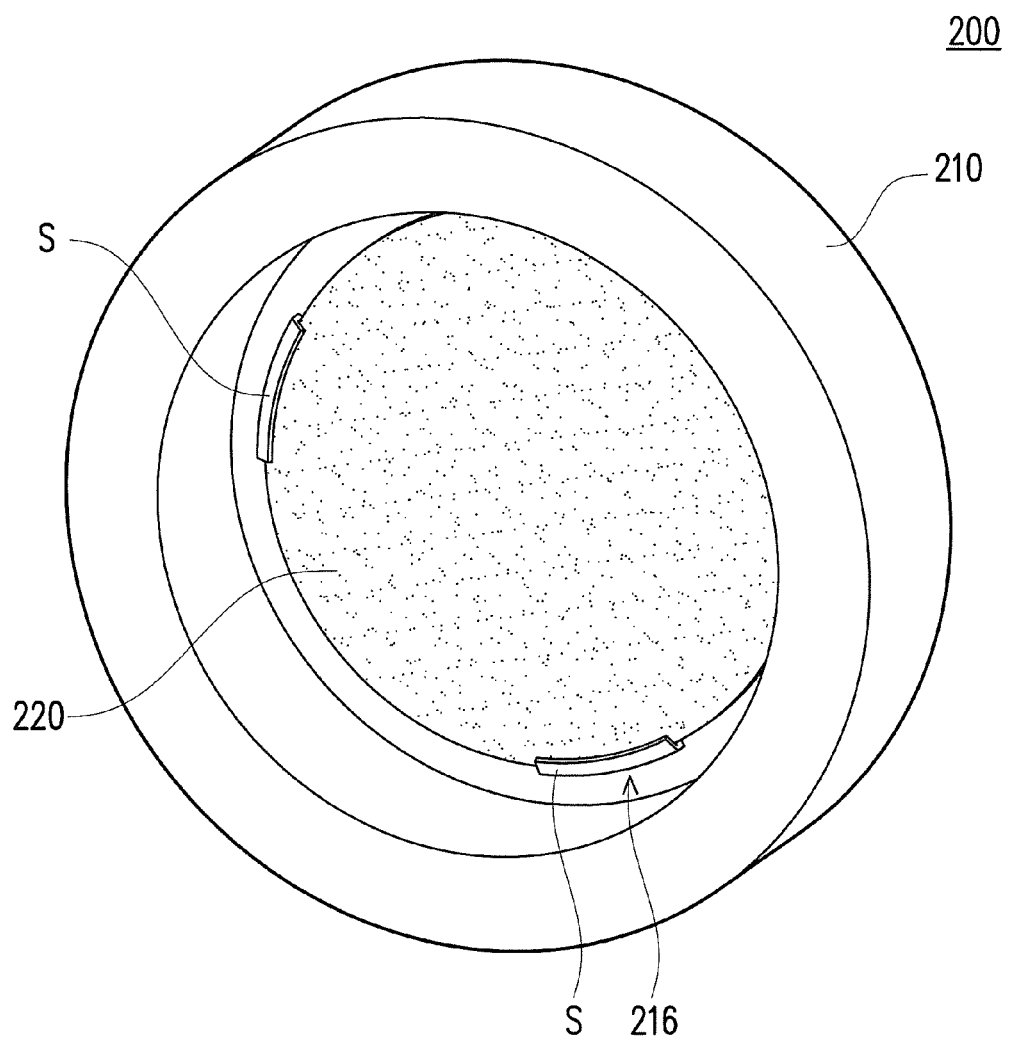
FIG. 6 is a three-dimensional diagram of a lens module according to another embodiment of the invention.
Figure 7:
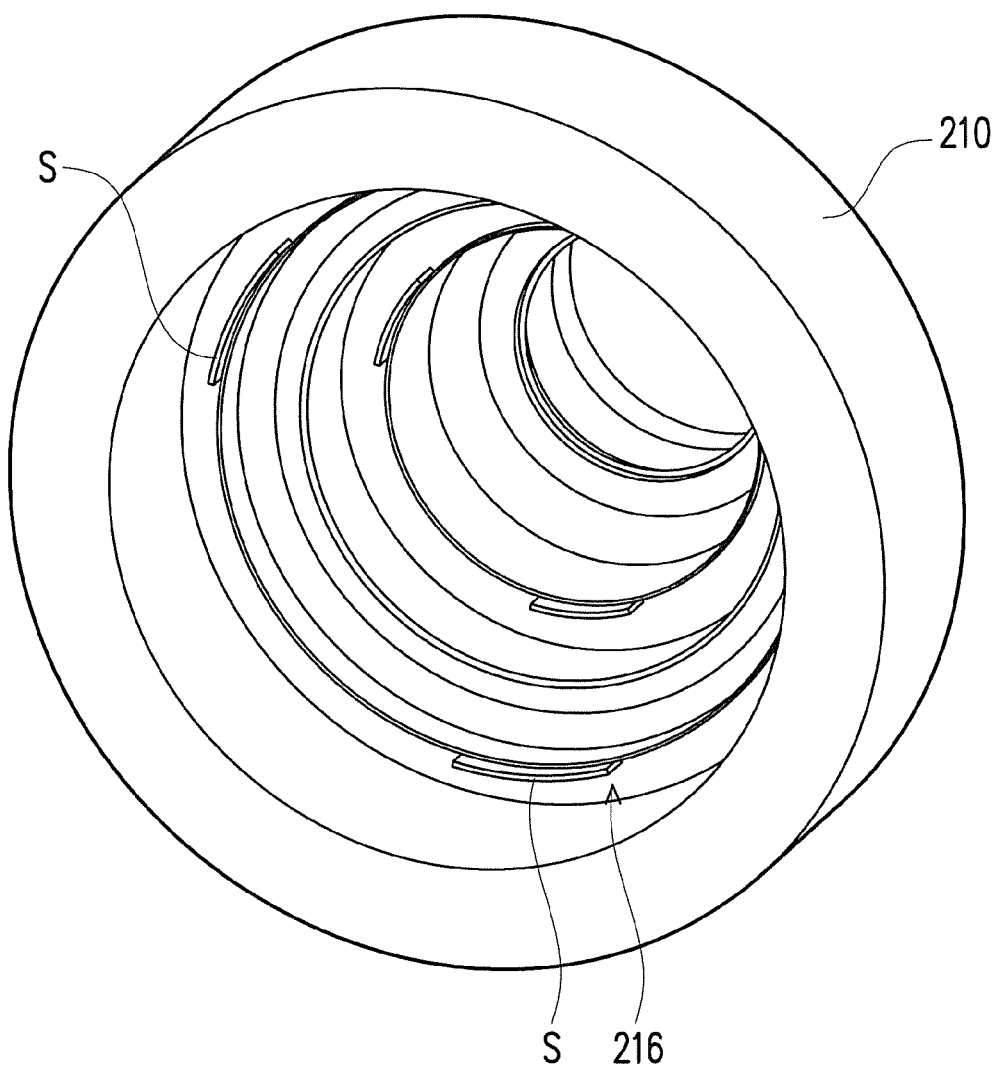
FIG. 7 is a three-dimensional diagram of the lens barrel in FIG. 6.

FIG. 6 is a three-dimensional diagram of a lens module according to another embodiment of the invention and FIG. 7 is a three-dimensional diagram of the lens barrel in FIG. 6. In FIG. 7, since the lens module 200 of FIG. 6 is not disposed at the lens barrel 210, the riveting portion 216 of FIG. 7 is not bended. Referring to FIGS. 6 and 7, the difference between the lens module 200 of the embodiment and the lens module 100 of FIG. 2 is the riveting portion 216 herein includes a plurality of sections S and the sections S are separated from each other and surround the lens 220 to fix the lens 220 at the lens barrel 210.

It should be noted that since the lens barrels 110 and 210 in the lens modules 100 and 200 could fix the optical lenses (for example, lenses) by riveting, the people skilled in the art could apply the lens modules 100 and 200 in other optical devices or imaging devices, for example, a camera.

In summary, in the above-mentioned embodiment of the invention, the riveting portion leaning against the side surface of lens and the inner wall of the lens barrel have a gap therebetween, so that a riveting equipment could easily extend into the gap to press and overlay the end of the riveting portion onto the light emitting surface of the lens and thereby to fix the lens. In this way, even the lens is located in the lens barrel, it is easier to fix the lens at the lens barrel through a riveting process by using an appropriate riveting equipment, which could save the manufacturing cost and advance the assembling accuracy and the reliability of the lens module. In addition, in the embodiments of the invention, through the interval between the riveting portion and the side surface of lens, it could be avoided the riveting portion pressing the lens during the riveting process to damage the lens.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising:
   a main body;
   a light source, disposed in the main body and capable of producing an illumination beam;
   a light valve, disposed in the main body and capable of converting the illumination beam into an image beam; and
   a lens module, disposed in the main body and comprising: a lens barrel, having an inner wall, a containing space, and at least one riveting portion, wherein the inner wall surrounds the containing space, the riveting portion is disposed in the containing space, and there is a gap between the riveting portion and the inner wall; and
   at least one lens, disposed in the containing space and having a light emitting surface and a side surface, wherein the side surface leans against the riveting portion, an end of the riveting portion extends to the light emitting surface so as to limit the lens in the containing space, and the image beam passes through the lens to form a projection beam.

2. The projection device as claimed in claim 1, wherein the side surface is parallel to the inner wall.

3. The projection device as claimed in claim 1, wherein the side surface is not parallel to the light emitting surface.

4. The projection device as claimed in claim 1, wherein at least one portion of the side surface and the riveting portion have an interval therebetween.

5. The projection device as claimed in claim 4, wherein the portion of the side surface is adjacent to the light emitting surface.

6. The projection device as claimed in claim 1, wherein quantity of the at least one riveting portion is multiple, quantity of the at least one lens is multiple, the riveting portions are respectively corresponding to the lenses, and the image beam sequentially passes through the lenses to form the projection beam.

7. The projection device as claimed in claim 1, wherein the riveting portion and the inner wall are integrally formed.

8. The projection device as claimed in claim 1, wherein the riveting portion is ringed and surrounds the at least one lens.

9. The projection device as claimed in claim 1, wherein the riveting portion comprises a plurality of sections and the sections are separated from each other and surround the at least one lens.

10. The projection device as claimed in claim 1, wherein the lens barrel has a retaining portion, each of the at least one lens has a relying surface, and the relying surface is opposite to the light emitting surface and leans against the retaining portion.

11. A lens module, comprising:
   a lens barrel, having an inner wall, a containing space, and at least one riveting portion, wherein the inner wall surrounds the containing space, the riveting portion is located in the containing space, and there is a gap between the riveting portion and the inner wall; and
   at least one lens, disposed in the containing space and having a light emitting surface and a side surface, wherein the side surface leans against the riveting portion, an end of the riveting portion extends to the light emitting surface so as to limit the lens in the containing space.

12. The lens module as claimed in claim 11, wherein the side surface is parallel to the inner wall.

13. The lens module as claimed in claim 11, wherein the side surface is not parallel to the light emitting surface.

14. The lens module as claimed in claim 11, wherein at least one portion of the side surface and the riveting portion have an interval therebetween.

15. The lens module as claimed in claim 14, wherein the portion of the side surface is adjacent to the light emitting surface.

16. The lens module as claimed in claim 11, wherein quantity of the at least one riveting portion is multiple, quantity of the at least one lens is multiple, and the riveting portions are respectively corresponding to the lenses.

17. The lens module as claimed in claim 11, wherein the riveting portion and the inner wall are integrally formed.

18. The lens module as claimed in claim 11, wherein the riveting portion is ringed and surrounds the at least one lens.

19. The lens module as claimed in claim 11, wherein the riveting portion comprises a plurality of sections and the sections are separated from each other and surround the at least one lens.

20. The lens module as claimed in claim 11, wherein the lens barrel has a retaining portion, each of the at least one lens has a relying surface, and the relying surface is opposite to the light emitting surface and leans against the retaining portion.

* * * * *